United States Patent [19]

Yoshimura et al.

[11] Patent Number: 4,466,832
[45] Date of Patent: Aug. 21, 1984

[54] COMPOSITION FOR FORMING HYDROPHILIC COATING

[75] Inventors: Tatsushiro Yoshimura, Takatsuki; Takeaki Nakazima, Ibaraki; Hiromasa Yokoi, Osaka, all of Japan

[73] Assignee: Daikin Kogyo Company, Limited, Osaka, Japan

[21] Appl. No.: 428,393

[22] Filed: Sep. 29, 1982

[30] Foreign Application Priority Data

Nov. 6, 1981 [JP] Japan .................................. 56-178813

[51] Int. Cl.³ .............................................. C04B 49/04
[52] U.S. Cl. ......................................... 106/74; 106/84
[58] Field of Search ................................. 106/74, 84

[56] References Cited

U.S. PATENT DOCUMENTS

| | | | |
|---|---|---|---|
| 3,493,401 | 2/1970 | Schutt et al. | 106/84 |
| 3,721,574 | 3/1973 | Schneider et al. | 106/74 |
| 3,846,182 | 11/1974 | Huff et al. | 148/6.2 |
| 3,989,550 | 11/1976 | Newhard | 148/6.16 |
| 4,162,169 | 7/1979 | Schutt | 106/74 |

*Primary Examiner*—James Poer
*Attorney, Agent, or Firm*—Armstrong, Nikaido, Marmelstein & Kubovcik

[57] ABSTRACT

A composition which comprises a mixture of:
(a) an alkali metal silicate having an $SiO_2/M_2O$ mole ratio of 2 to 5,
(b) a hydrophilic silicic acid or silicate in the form of fine particles, and
(c) a silane coupling agent, or an ortho-acid ester of a transition element in Group IV of the Periodic Table or a derivative of the ester forms hydrophilic coatings which are outstanding in durability, corrosion resistance and adhesion.

14 Claims, 1 Drawing Figure

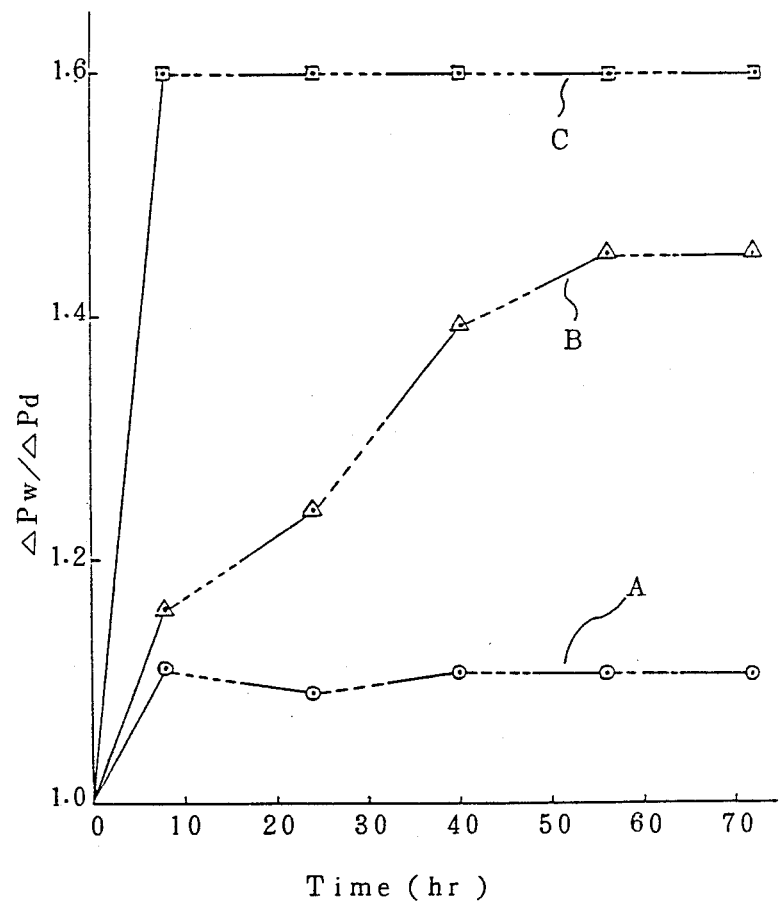

COMPOSITION FOR FORMING HYDROPHILIC COATING

The present invention relates to compositions for forming hydrophilic coatings.

In recent years, it has been required that devices and apparatus in general be provided in ever smaller sizes with ever higher performance for savings in energy. Heat exchangers for use in air conditioning systems, etc. are no exception to this trend. Louver fins have been devised and used for heat exchangers as means for improving the heat exchange characteristics. An assembly of such louver fins is formed from fin plates made of aluminum or an alloy thereof and arranged in parallel by providing closely arranged cuts in the fin plates and raising the cut portions to such an extent that the fins thus formed on one plate will not contact those on another plate. The assembly is therefore adapted for improved performance. With such an arrangement of louver fins, the distance between the fin plates is smaller than formerly, so that the drops of water formed on condensation while the heat exchanger is in cooling operation are likely to be held between the fin plates by virtue of capillarity, consequently producing greatly increased resistance to the flow of air to impede the air flow. When air is passed through the fin arrangement at a higher velocity to render the heat exchanger more efficient, the water drops held between the fin plates are forced out with the air and scattered undesirably. Furthermore the condensed water causes corrosion to the aluminum, impairing the heat exchange characteristics with the corrosion product.

Continued research has been conducted to solve these problems. As a solution thereto, for example, it is practiced to form a hydrophilic coating on the fins, pipes, etc. of a heat exchanger to render the coated surfaces of these components uniformly wettable with water drops on condensation and thereby greatly reduce the resistance to the air flow, consequently reducing the power consumption for savings in energy.

Compositions for forming hydrophilic coatings include organic ones and inorganic ones. Organic compositions containing an aqueous coating resin, such as the one disclosed in Published Unexamined Japanese Patent Application No. 164,264/1980, have the advantage of possessing good ability to form coatings and being highly amenable to coating operation in that the coating is unlikely to crack and free of peeling even during application, whereas they have the drawback that the coating has low durability due to the degradation of the resin and is susceptible to peeling in the presence of water when the resin used is hydrophilic. They have another drawback that the coating is inferior to inorganic coatings in heat transfer efficiency and impairs the inherent performance of the fins. U.S. Pat. No. 3,846,182 and U.S. Pat. No. 3,989,550 disclose methods of forming an inorganic hydrophilic coating on an aluminum surface. According to the former, the aluminum surface is treated with a first solution containing both an alkali metal carbonate and an alkali metal chromate or dichromate, and with a second solution containing an alkali metal oxide and silicon dioxide. In the case of the latter, the aluminum surface is treated with a first solution containing active fluoride, chromate ion and phosphate ion, and with a second solution containing an alkali metal silicate. The coatings prepared from inorganic compositions have higher hardness, so that when coated aluminum plates are assembled into fins as by cutting or bending, cracks will develop or, in an extreme case, the coating will peel off. Moreover, such inorganic coatings, being small in crack-free limit thickness, are limited only to thin coatings and therefore have the drawback that if it is attempted to form a coating which has a thickness not larger than the limit thickness even where it is thickest in view of coating irregularities, the thinnest portion of the coating becomes too thin to completely cover the irregularities in the aluminum surface.

Because of these problems, various compositions for forming hydrophilic coatings are under investigation, whereas none of the compositions heretofore proposed are fully useful in respect of sustained hydrophilic properties, namely in the durability of the coating. In fact, many of the conventional coatings become impaired in hydrophilic properties when subjected to repeated cycles of cooling operation involving interruptions (during which the fins are dry). Further even if withstanding such cycles, the coating invariably deteriorates in hydrophilic properties when subjected to repeated cycles of cooling and heating, permitting an increase in resistance to the air stream during the cooling operation.

An object of the invention is to provide a composition for forming hydrophilic coatings having high durability.

Another object of the invention is to provide a composition for forming hydrophilic coatings which are outstanding in corrosion resistance and adhesion.

Another object of the invention is to provide a composition for forming hydrophilic coatings which are large in crack-free limit thickness.

According to the invention, it is possible to provide, for example, heat exchangers which are reduced in resistance to the air stream and have outstanding heat exchange characteristics, air conditioning systems which have such heat exchangers incorporated therein for cooling or heating air, etc.

The present invention provides a composition for forming hydrophilic coatings which comprises a mixture of:

(a) an alkali metal silicate having an $SiO_2/M_2O$ mole ratio of 2 to 5, (b) a hydrophilic silicic acid or silicate in the form of fine particles, and (c) a silane coupling agent, or an ortho-acid ester of a transition element in Group IV of the Periodic Table or a derivative of the ester.

We have found that the composition comprising the above three components (a) to (c) overcomes the problems of the prior art and gives a coating capable of retaining outstanding hydrophilic properties at all times even when repeatedly subjected to a large number of cooling-heating cycles, consequently making it possible to provide, for example, a heat exchanger which is reduced in resistance to the air stream and has excellent heat exchange characteristics. Air conditioning systems having incorporated a heat exchanger coated with the present composition, when operating for dehumidification, will not scatter water off the fins of the exchanger even at a high air velocity. Such a system can therefore be adapted to operate at an increased air velocity to achieve an improved heat transfer efficiency. This serves to render the system compact and less costly. The above remarkable advantage realized by the present invention is presumably attributable to the presence of fine hydrophilic particles of silicic acid or silicate as distributed over a hydrophilic coating of the alkali metal silicate, whereas the foregoing U.S. patents provide uniform hydrophilic coatings only.

The alkali metal silicates to be used in this invention preferably have an $SiO_2/M_2O$ mole ratio of 2 to 5. When having such a mole ratio, the silicates have good ability to form coatings. Examples of useful alkali metals (M) are lithium, sodium, potassium, etc., among which lithium is especially preferable.

Examples of useful hydrophilic silicic acids in the form of fine particles are dispersions or colloid solutions of silicic acid, silicic acid anhydride, etc. Colloidal silica is especially preferable. Preferred particle sizes are usually about 3 to about 30 m$\mu$. Examples of useful silicates are natural and synthetic silicates, such as kaolin, clay, talc, bentonite, calcium silicate, aluminum silicate, kieselguhr, asbestos, zeolite, etc., which are preferably about 0.5 to about 2$\mu$ in particle size.

Examples of useful silane coupling agents are compounds represented by the formula

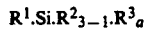

$$R^1.Si.R^2{}_{3-1}.R^3{}_a$$

wherein $R^1$ is alkyl having 1 to 10 carbon atoms and having at least one functional atom or group selected from the group consisting of chlorine atom, amino, aminoalkyl, ureido, glycidoxy, epoxycyclohexyl, acryloyloxy, methacryloyloxy, mercapto and vinyl, or vinyl, $R^2$ and $R^3$ are each an atom or a group selected from the group consisting of chlorine atom, hydroxyl, alkoxy having 1 to 10 carbon atoms, alkoxy-substituted alkoxy having 2 to 15 carbon atoms, hydroxyalkoxy having 2 to 4 carbon atoms and acyloxy having 2 to 15 carbon atoms, and a is 0, 1 or 2.

Examples of preferred alkyl groups having a functional substituent and represented by $R^1$ are $\beta$-aminoethyl, $\gamma$-aminopropyl, N-($\beta$-aminoethyl)-$\gamma$-aminopropyl, $\gamma$-ureidopropyl, $\gamma$-glycidoxypropyl, $\beta$-(3,4-epoxycyclohexyl)-ethyl, $\gamma$-acryloyloxypropyl, $\gamma$-methacryloyloxypropyl, $\gamma$-mercaptopropyl, $\beta$-chloroethyl, $\gamma$-chloropropyl, $\gamma$-vinylpropyl, etc. The group $R^1$ may be vinyl.

Examples of preferred silane compounds are $\gamma$-aminopropyltriethoxysilane, N-($\beta$-aminoethyl)-$\gamma$-aminopropyltrimethoxysilane, $\gamma$-ureidopropyltriethoxysilane, $\gamma$-glycidoxypropyltrimethoxysilane, $\beta$-(3,4-epoxycyclohexyl)-ethyltrimethylsilane, $\gamma$-methacryloxypropyltrimethoxysilane, $\gamma$-mercaptopropyltrimethoxysilane, $\gamma$-chloropropyltrimethoxysilane, vinyltris($\beta$-methoxyethoxy)silane, vinyltriethoxysilane, vinyltrichlorosilane, vinyltriacetoxysilane, etc., among which especially preferable are $\gamma$-aminopropyltriethoxysilane and $\gamma$-glycidoxypropyltrimethoxysilane.

Examples of ortho-acid esters of transition elements T in Group IV of the Periodic Table or derivatives thereof are compounds represented by the formula $T(OR)_4$ or derivatives prepared by reacting such compounds with at least one compound having at least one functional group. In the above, R is a hydrocarbon residue such as alkyl, cycloalkyl or aryl each having 1 to 10 carbon atoms. Preferred examples of the group R are methyl, ethyl, butyl, octyl, cyclopentyl, cyclohexyl, phenyl, tolyl, xylyl, butylphenyl, etc. Typical of transition elements T in Group IV are, for example, titanium, zirconium, hafnium and thorium. Examples of compounds having at least one functional group are glycerin, ethylene glycol, 1,3-butanediol, 2,3-butanediol, hexylene glycol, octylene glycol and like polyhydric alcohols, salicylaldehyde, glucose and like hydroxyaldehydes, diacetone alcohol, fructose and like hydroxy-ketones, glycollic acid, lactic acid, dihydroxymaleic acid, citric acid and like hydroxycarboxylic acids, diacetylacetone and like diketones, acetoacetic acid and like ketonic acids, ethyl acetoacetate and like ketonic acid esters, triethanolamine, diethanolamine and like hydroxyamines, catechol, pyrogallol and like hydroxyphenol compounds, etc.

Examples of compounds containing titanium as the element T are tetraalkyl titanates (such as tetraethyl titanate, tetraisopropyl titanate and tetrabutyl titanate), tetraethyleneglycol titanate, triethanolamine titanate, titanium acetylacetonate, isopropyltrioctanoyl titanate, isopropyltrimethacryl titanate, isopropyltriacryl titanate, isopropyltri(butyl, methyl pyrophosphate)titanate, tetraisopropyldi(dilaurylphosphite)titanate, dimethacryloxy acetate titanate, diacryloxy acetate titanate, di(dioctylphosphate)ethylene titanate, etc. Similar compounds can be exemplified when the element T is zirconium, hafnium or thorium. Of these examples, especially preferred ortho-acid esters or derivatives thereof are tetrabutyl titanate, triethanolamine titanate and titanium acetylacetonate.

According to the present invention, it is desirable to use the components in the following proportions by weight calculated as solids: 100 parts of the alkali metal silicate (a), about 0.5 to about 50 parts of the hydrophilic silicic acid or silicate (b), and about 0.1 to about 10 parts of the silane coupling agent, or ortho-acid ester or derivative thereof (c). The composition of the invention, which can be prepared by any method, is usually prepared by uniformly admixing the components (b) and (c) with an aqueous solution of the component (a). It is especially preferable to use the components (b) and (c) each in the form of an aqueous solution or dispersion. The resulting mixture can be diluted suitably with water. The composition preferably has a solids concentration of about 5 to about 20% by weight.

The composition of this invention for forming hydrophilic coatings is usable for heat exchangers and various other devices or apparatus. It is applied to an aluminum, copper or like metal surface by a usual known method, for example, by brushing, spraying, electrostatic coating or immersion. The coating is then allowed to stand at room temperature or heated at a temperature of at least about 100° C. for hardening, whereby the desired coating is obtained. Although a low hardening temperature is desirable to give high hydrophilic properties to the coating surface, low temperatures require a long period of time for hardening, so that it is favorable for a commercial operation to harden the coating with heating at an elevated temperature. However, because the coating becomes degraded in hydrophilic properties when heated at a high temperature for too long a period of time, it is generally preferable to treat the coating for a shorter period of time at a higher temperature. The treating time is usually at least about 60 minutes at room temperature (20° to 30° C.), about 10 to about 20 minutes at 100° C., about 30 seconds to about 5 minutes at 200° C., or about 20 to about 60 seconds at 400° C.

As will be apparent from the test examples to follow and FIG. 1 showing the test results, the composition of this invention provides a hydrophilic surface which, unlike conventional coatings, remains almost unchanged in resistance to an air stream, retaining a value approximately equivalent to the initial value, even when the surface, as formed on a heat exchanger, is subjected to a large number of repeated cycles of cooling and heating, hence outstanding durability. Further the present composition forms hydrophilic coatings which are large in crack-free limit thickness and excellent in corrosion resistance and adhesion.

The invention will be described below in detail with reference to the following examples and test examples.

EXAMPLE 1

| LITHIUM SILICATE 35[1] | 4000 g |
|---|---|
| Colloidal silica, "SNOWTEX"[2] | 200 g |
| Aqueous solution of triethanolamine titanate[3] | 40 g |
| Water | 4000 g |

Note:
[1]Aqueous solution of lithium silicate produced by Nissan Chemical Industries Ltd., Japan and containing 20 wt. % $SiO_2$ and 2.9 wt. % $Li_2O$.
[2]Aqueous solution (20 wt. %) produced by Nissan Chemical Industries Ltd. and about 20 mμ in mean particle size.
[3]Containing 20% $TiO_2$.

The above ingredients are uniformly mixed together by a stirrer to prepare a composition of the invention.

EXAMPLE 2

A composition of the invention is prepared from the following ingredients in the same manner as in Example 1.

| LITHIUM SILICATE 35 | 1000 g |
|---|---|
| AIDPLUS[4] | 20 g |
| Aqueous solution of triethanolamine titanate | 30 g |
| Water | 2000 g |

Note:
[4]Silicate powder produced by Takeda Chemical Industries Ltd., Japan and about 1μ in mean particle size.

EXAMPLE 3

A composition of the invention is prepared from the following ingredients in the same manner as in Example 1.

| LITHIUM SILICATE 35 | 1000 g |
|---|---|
| DIMONITE[5] | 20 g |
| Aqueous solution of triethanolamine titanate | 30 g |
| Water | 2000 g |

Note:
[5]Fluorine-containing colloidal magnesium silicate powder produced by Topy Industries Ltd., Japan and about 1μ in mean particle size.

EXAMPLE 4

A composition of the invention is prepared from the following ingredients in the same manner as in Example 1.

| LITHIUM SILICATE 35 | 4000 g |
|---|---|
| Colloidal silica, "SNOWTEX" | 200 g |
| γ-Aminopropyltriethoxysilane (50% aqueous solution) | 40 g |
| Water | 4000 g |

EXAMPLE 5

A composition of the invention is prepared in the same manner as in Example 1 except that an aqueous solution of titanium acetylacetonate (containing 20% $TiO_2$) is used in place of the aqueous solution of triethanolamine titanate.

EXAMPLE 6

A composition of the invention is prepared in the same manner as in Example 4 except that γ-glycidoxypropyltrimethoxysilane is used in place of γ-aminopropyltriethoxysilane.

COMPARISON EXAMPLE 1

For comparison, a composition is prepared from the following ingredients.

| LITHIUM SILICATE 35 | 4000 g |
|---|---|
| Water | 4000 g |

COMPARISON EXAMPLE 2

For comparison, a composition is prepared from the following ingredients.

| HITALOID 7113[6] | 60 g |
|---|---|
| Colloidal silica, "SNOWTEX" | 40 g |
| Water | 30 g |

Note:
[6]Aqueous solution of water-soluble acrylic resin containing 50% solids and produced by Hitachi Chemical Co., Ltd., Japan.

TEST EXAMPLE 1

Aluminum sheets, 100μ in thickness, are immersed in trifluorotrichloroethane for 30 seconds to remove grease and foreign matter from the sarfaces for cleaning. The aluminum sheets are then immersed in one of the compositions prepared in Examples 1 to 6 and Comparison Examples 1 and 2 for 60 seconds for coating and thereafter heated at 120° C. for 10 minutes to harden the coatings. The resulting coatings are tested for physical properties by the following methods. Table 1 shows the results.

1. Pencil hardness

Measured according to JIS K 6894 at a temperature of 25±2° C.

2. Cross-cut test

One hundred squares are formed in the coating with a cutter knife by forming 11 parallel cut lines in the coating at a spacing of 1 mm both horizontally and vertically in intersecting fashion to such a depth as to deface the substrate. A commercial cellophane adhesive tape is affixed to the coating over the squares under hand pressure and thereafter peeled off instantaneously at an angle of about 90° with respect to the coating, with the opposite ends of the tape held by hand. After repeating the above procedure ten times for the same group of squares with use of different pieces of tape, the number of remaining coating squares is counted.

3. Contact angle

The contact angle of water on the coating is measured at room temperature (25±2° C.) with use of a goniometer, product of Erma Optical Co., Ltd., Japan.

4. Limit thickness of coating

The composition is caused to flow over an aluminum sheet for coating, and the crack-free limit thickness of coating is determined. When the sheet is coated in this manner, the thickness of the coating increases downstream along the path of flow of the composition and therefore has a gradient. The coating is checked for cracks with the unaided eye, and the largest thickness free of any crack is measured with a micrometer as the limit thickness.

found to remain at a value almost equivalent to the initial value.

We claim:

1. A composition for forming hydrophilic coatings which comprise a mixture of:
   (a) an alkali metal silicate having a $SiO_2/M_2O$ mole ratio of 2 to 5 and a particle size of about 0.5 to about $2\mu$,
   (b) a hydrophilic silicic acid or silicate in the form of fine particles of about 3 to about 30 m$\mu$, and
   (c) an ortho-acid ester of a transition element in Group IV of the Periodic Table or a derivative of the ester.

TABLE 1

|  | Example | | | | | | Comparison Example | |
|---|---|---|---|---|---|---|---|---|
|  | 1 | 2 | 3 | 4 | 5 | 6 | 1 | 2 |
| Pencil hardness | 2H | 3H | 3H | 2H | 2H | 2H | 2H | 2H |
| Cross-cut test | 100/100 | 100/100 | 100/100 | 100/100 | 100/100 | 100/100 | 100/100 | 100/100 |
| Contact angle (degree) | 0 | 0 | 0 | 0 | 0 | 0 | 60 | 30 |
| Limit thickness of coating ($\mu$) | 3–5 | >5 | >5 | 3–5 | 3–5 | 3–5 | <1 | 15 |

TEST EXAMPLE 2

The compositions of Example 1 and Comparison Example 2 are applied by immersion to efficient air heat exchangers, individually, each having an air intake area of 254 mm×600 mm and a depth of 35 mm and equipped with louver fins. These heat exchangers and another identical heat exchanger having no coating are operated repeatedly for cooling and heating, for 8 hours for each, by passing air through the heat exchangers at a velocity of 2 m/sec. at the front side thereof and under the temperature and humidity conditions listed in Table 2. The refrigerant flows into the pipe of each exchanger at a temperature of 5° C. for cooling and at 50° C. during heating.

TABLE 2

|  | Relative humidity | Dry-bulb temp. | Wet-bulb temp. |
|---|---|---|---|
| Humid air for cooling | 50% | 27° C. | 19° C. |
| Dry air for heating | 50% | 21° C. | 14.5° C. |

FIG. 1 is a graph in which plotted as ordinate is the ratio of the resistance of the fins to air, $\Delta Pw$, at the end point of each cooling cycle to the corresponding resistance, $\Delta Pd$, during heating (i.e. wet/dry air resistance ratio, $\Delta Pw/\Delta Pd$) vs. the time as abscissa. In FIG. 1, the lines A and B represent the results achieved by the use of the compositions of Example 1 and Comparison Example 2, respectively, and the line C those achieved in the absence of coating. Each dotted-line section of the lines corresponds to the heating operation, during which the $\Delta Pw/\Delta Pd$ ratio is actually about 1.0 in any case. For the convenience of description, however, the heating operation between the successive cooling cycles is indicated in a straight dotted line. Each cooling cycle is represented by a solid line section.

FIG. 1 shows that the heat exchanger coated with the composition of the invention and represented by the line A undergoes little or no change in the wet/dry air resistance ratio during cooling, thus retaining a constant value close to the initial value, even after five repeated dry-wet cycles. In the comparison cases represented by the lines B and C, however, the wet/dry air resistance ratios even in the first cycle are higher than the ratio shown by the line A, and the ratio represented by the line B greatly increases every cycle.

To confirm the advantage of the invention, the heat exchanger coated with the composition of Example 1 is further subjected to the same dry-wet cycle as above 50 times. As a result, the wet-dry air resistance ratio is 2. A composition as defined in claim 1 wherein the alkali metal silicate is lithium silicate, sodium silicate or potassium silicate.

3. A composition as defined in claim 2 wherein the alkali metal silicate is lithium silicate.

4. A composition as defined in claim 1 wherein the hydrophilic silicic acid is a dispersion or colloid solution of silicic acid or silicic acid anhydride.

5. A composition as defined in claim 4 wherein the hydrophilic silicic acid is a colloidal silica.

6. A composition as defined in claim 1 wherein the silicate is kaolin, clay, talc, bentonite, calcium silicate, aluminum silicate, kieselguhr, asbestos or zeolite.

7. A composition as defined in claim 1 wherein the ortho-acid esters of transition elements (T) in Group IV of the Periodic Table or derivatives thereof are compounds represented by the formula $T(OR)_4$ or derivatives prepared by reacting such compounds with at least one compound having at least one functional group, R being alkyl, cycloalkyl or aryl each having 1 to 10 carbon atoms.

8. A composition as defined in claim 7 wherein the transition element (T) is titanium, zirconium, hafnium or thorium.

9. A composition as defined in claim 7 wherein the ortho-acid ester or derivative thereof is tetrabutyl titanate, triethanolamine titanate, titanium acetylacetonate or zirconium, hafnium and thorium compound corresponding to the above titanium compound.

10. A composition as defined in claim 1 wherein the components (a) to (c) are used in the following proportions by weight calculated as solids: 100 parts of the alkali metal silicate (a), about 0.5 to about 50 parts of the hydrophilic silicic acid or silicate (b), and about 0.1 to about 10 parts of the ortho-acid ester or derivative thereof (c).

11. A composition as defined in claim 1 wherein the solids concentration is about 5 to about 20% by weight.

12. An article coated with a composition of claim 1.

13. An article as defined in claim 12 wherein the articles are fins and pipes of a heat exchanger.

14. An air conditioning apparatus having incorporated a heat exchanger obtained in claim 13.

* * * * *